UNITED STATES PATENT OFFICE.

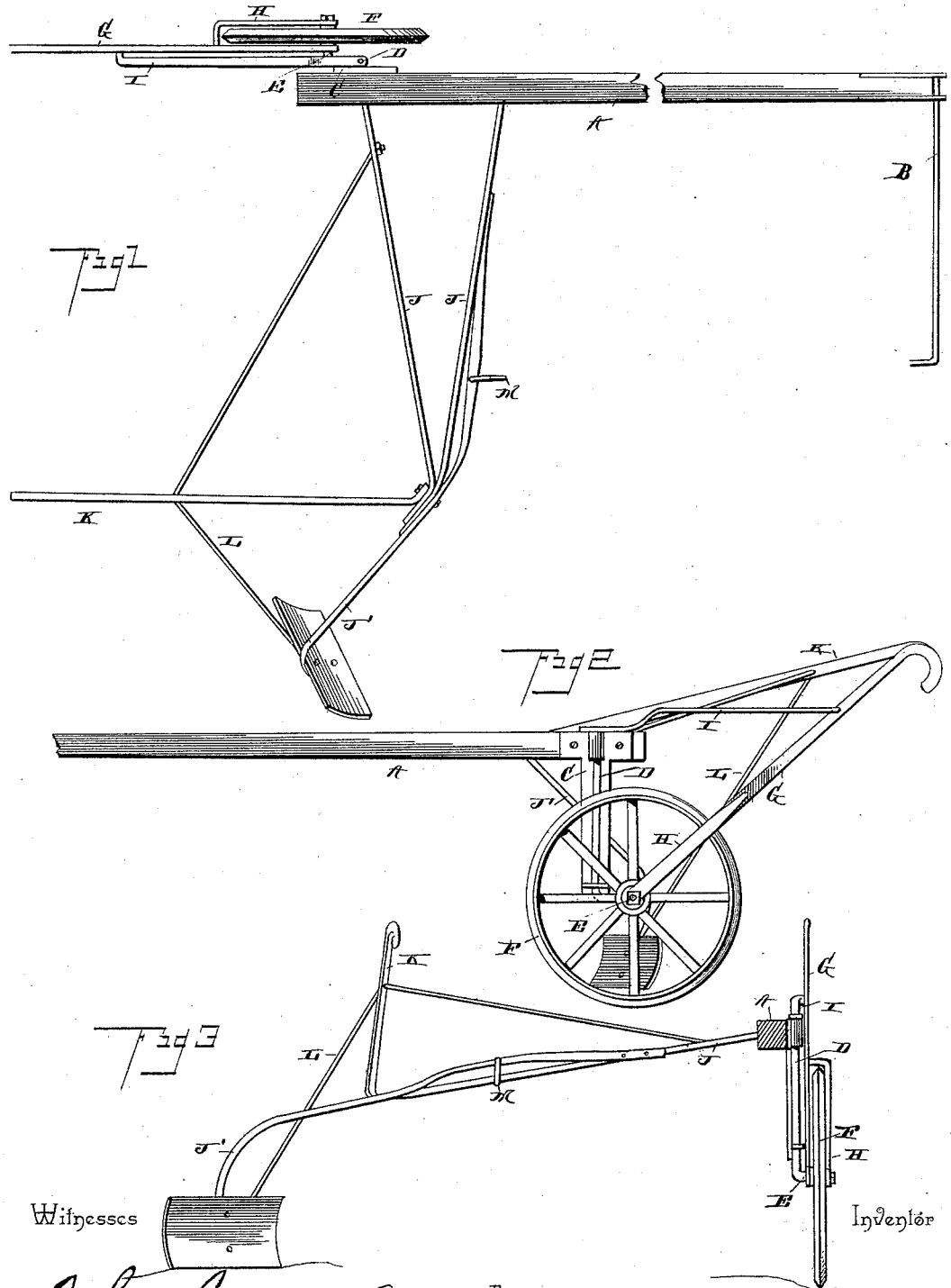

NELSON BELLIS, OF BLOOD'S DEPOT, NEW YORK, ASSIGNOR OF ONE-HALF TO WILLIAM V. STEVENS, OF SAME PLACE.

PLOW.

SPECIFICATION forming part of Letters Patent No. 430,983, dated June 24, 1890.

Application filed August 10, 1889. Serial No. 320,384. (No model.)

*To all whom it may concern:*

Be it known that I, NELSON BELLIS, a citizen of the United States, residing at Blood's Depot, in the county of Steuben and State of New York, have invented a new and useful Plow, of which the following is a specification.

My invention relates to improvements in plows for use in cultivating vines and berry-bushes; and it consists in certain novel features hereinafter described and claimed.

In the drawings, Figure 1 is a plan view of my improved plow. Fig. 2 is a side view of the same, and Fig. 3 is a front view.

The pole or tongue A may be of any suitable material and of any desired size, and to the front end of the said pole or tongue I secure the laterally-projecting arm B, to the free end of which I secure a neck-yoke in the usual manner.

At the rear end of the tongue, on the side of the same, I secure the bracket C, in which a rotary standard D is mounted, the said standard being provided with an axle E at its lower end, on which the carrying-wheel F is mounted. This carrying-wheel F is provided with a beveled or sharpened periphery, so that it will take into the ground, and thereby guide the plow as it is drawn over the field.

One of the handles G has its lower end mounted on the axle E, and it is provided with a bail H, which is adapted to pass around the wheel, and its end is mounted on the axle. The handle is suitably braced by a bar I, having its rear end secured to the handle and its front end fitted on the rotary standard.

The plow-supporting frame consists of the beams J J, secured to the plow-tongue and projecting laterally therefrom and having their outer ends secured together. The plow-standard J' is secured to these beams, and the handle K is also secured thereto, as shown. The plow-shovel is secured to the lower end of the standard, and is braced by a rod or bar L, which extends from the lower end of the standard through the handle K, and then to the rear beam J, where it is secured. The upper front end of the standard is extended slightly forward from the front beam J and is secured to the said beam, and the draft-hook M is attached to the extended portion of the standard.

In practice the draft-animal is harnessed to the draft-hook M and the neck-yoke, and the plow is then drawn over the field in the usual manner. The plow is guided by turning the guiding and steering wheel to one side or the other, as will be readily understood, and the plow-shovel will run close to the vines or bushes and turn up the loose fine dirt and throw the same away from the plants.

It will be observed that my device is so arranged that the draft-animal can walk very close to the plants without being liable to injure the same, and the shovel will be made to run very close to the plants without cutting the same.

It will be noticed that the handle G and the bail H fit on the axle on opposite sides of the guiding-wheel, so that the said wheel is prevented from moving longitudinally of the axle. The arrangement also enables the driver to steer the plow very easily, as the power applied to the handle will be transmitted to a point near the end of the axle, and the axle consequently easily vibrated. The brace I partially supports the handle and thereby prevents the weight of the same and the bail bending the axle.

By constructing the share-holding frame in the manner shown and described the weight of the machine is reduced to a minimum, and at the same time it is given great strength and durability. The beams J J, being made to converge, support and brace the plowshare both longitudinally and transversely, and the share is further held to its work by the brace L, and the said brace, by reason of its peculiar shape, prevents lateral movement of the handle, so that great rigidity is given the frame and the plow easily held to its work.

Having thus described my invention, what I claim, and desire to secure by Letters Patent, is—

1. The combination of the tongue, the bracket C, secured on the side of the same, the rotary standard mounted in said bracket and having an axle E at its lower end, the carrying-wheel mounted on said axle, the handle fitted on the axle on one side of the wheel, the bail secured to the handle and fitted on the axle on the other side of the wheel, and the brace secured to the handle and fitted on the upper end of the rotary standard, as set forth.

2. The combination of the tongue, the swiveled wheel, the converging beams extending laterally therefrom, the plow-standard secured to the ends of said beams, the plow-shovel secured to the standard, the handle secured to and extending rearward from the converging beams, and the brace L, secured to the plow-shovel, extending to the handle and secured thereto, and thence extending to the rear beam and secured to the same, as set forth.

3. The combination of the tongue A, the wheel F, the converging beams J, extending laterally from the tongue, and the plow-standard J', attached to the front side of the forward beam J, extending alongside the same to its outer end, then bent laterally and rearwardly at an angle and having the shovel attached thereto, as set forth.

4. The combination of the tongue A, the wheel F, the converging beams J, extending laterally from the tongue, the plow-standard J', attached to the front side of the forward beam J, extending alongside the same to its outer end, then bent laterally and rearwardly at an angle and having the shovel attached thereto, the handle K, attached to the beams J at the point where the plow-standard is bent rearwardly, and the double inclined brace attached to the handle, one arm of the brace connecting with one of the beams J and the other arm attached to the shovel, as set forth.

5. The combination of the tongue A, the wheel F, the converging beams J, the plow-standard J', the handle K, and the double inclined brace L, as set forth.

6. A plow consisting of a tongue, a rigid frame extending laterally on one side and carrying a shovel, a handle connected to the frame, a wheel mounted in a rotary standard on the other side of the tongue, and a handle connected to the standard for the purpose of guiding the wheel, as set forth.

In testimony that I claim the foregoing as my own I have hereto affixed my signature in presence of two witnesses.

NELSON BELLIS.

Witnesses:
  R. P. MOULTON,
  A. T. HOXTER.